Mar. 13, 1923.

O. KROEHLE.
PULL CABLE CLIP.
FILED AUG. 18, 1922.

1,448,545.

INVENTOR,
Oscar Kroehle
by
Thurston Kwis & Hudson
attys.

Patented Mar. 13, 1923.

1,448,545

UNITED STATES PATENT OFFICE.

OSCAR KROEHLE, OF LAKEWOOD, OHIO, ASSIGNOR TO THE PROTEX SIGNAL COMPANY, OF CLEVELAND, OHIO, A CORPORATION OF OHIO.

PULL-CABLE CLIP.

Application filed August 18, 1922. Serial No. 582,667.

*To all whom it may concern:*

Be it known that I, OSCAR KROEHLE, a citizen of the United States, residing at Lakewood, in the county of Cuyahoga and State of Ohio, have invented a certain new and useful Improvement in Pull-Cable Clips, of which the following is a full, clear, and exact description.

This invention relates to a pull cable clip for use in stop signal devices for automobiles in which the signal lamp switch is operated by a cable attached to the brake rod or to the brake pedal.

In certain makes of automobiles there is no brake rod to which the switch operating pull cable can be attached and in applying a stop signal device to such a machine it is necessary to connect the switch operating cable directly to the brake pedal.

The present invention has for its object to provide a single clip which can be used to connect the pull cable either to a brake rod or to a brake pedal, so that a single standard stop signal set can be applied to any make of automobile and it is not necessary for dealers to be supplied with special parts for different types of cars.

Figure 1:
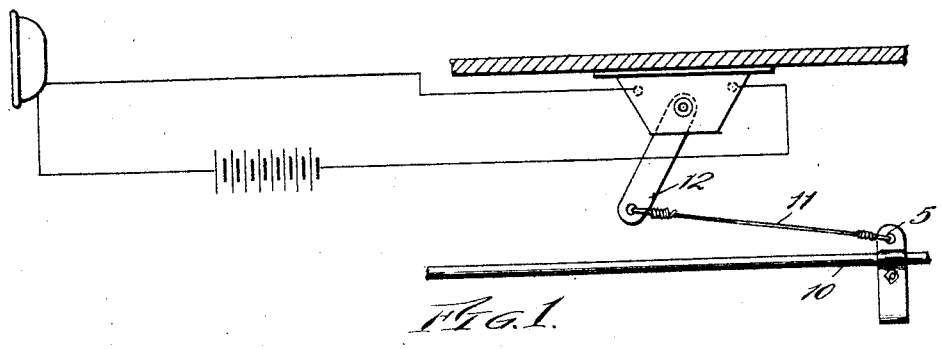
Figure 2:
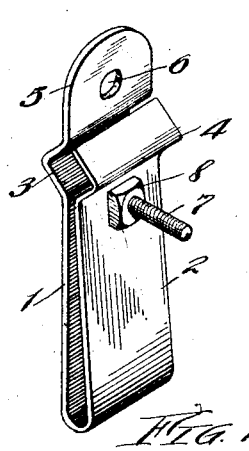
Figure 3:
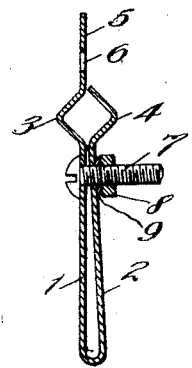
Figure 4:
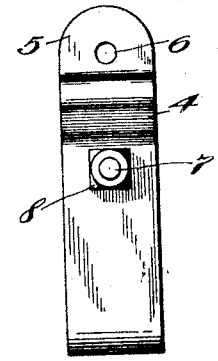

Fig. 1 is a diagrammatic view showing a stop signal switch connected through a cable to a brake rod by means of the improved clip; Fig. 2 is a perspective view of the clip; Fig. 3 is an edge elevation thereof; Fig. 4 is a side elevation of the clip, and Fig. 5 is a fragmentary view showing the clip attached to a brake pedal.

As shown in the drawing, the improved clip consists of a strip of flexible metal bent upon itself to form opposing jaws 1 and 2, which adjacent their outer free ends are bowed outwardly to provide complemental recesses 3 and 4 to receive a brake rod. The jaw 1 has an extension 5 beyond the recessed portion 3 thereof provided with an aperture 6 adapted to receive the pull cable. Adjacent the inner edges of the recessed portions 3 and 4 of the jaws a bolt 7 passes through the jaws and carries a nut 8 and washer 9 by means of which the jaws 1 and 2 can be drawn together. The clip is of sufficient length to provide a portion between the bolts 7 and the inner ends of the jaws adapted to encircle the arm of a brake pedal. Fig. 1 of the drawing shows the clip attached to a brake rod 10 and a pull cable 11 connecting the extension 5 of the clip with a switch lever 12.

Figure 5:
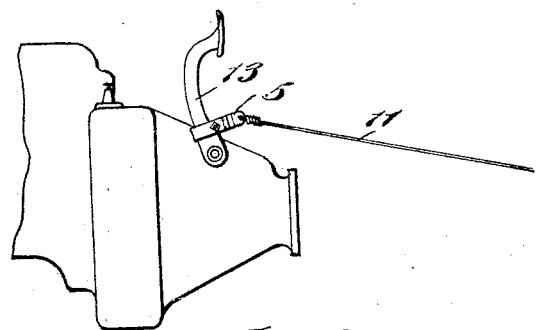

Fig. 5 of the drawing shows the clip attached to a brake pedal 13 and a pull cable 11 attached to the extension 5 of the clip. In applying the clip to a brake rod the nut 8 is unscrewed sufficiently to permit the free ends of the jaws 1 and 2 to be slipped over the brake rod. The nut 8 is then tightened drawing the outwardly bowed portions 3 and 4 into tight engagement with the brake rod. When it is desired to secure the clip to the arm of a pedal lever, the bolt 7 is removed and the jaws 1 and 2 sprung apart and slipped from the arm of the brake pedal. The bolt 7 is then inserted and the nut 8 tightened thereon to draw the clip into tight engagement with the brake pedal.

Having described my invention, I claim:

1. A pull cable clip comprising a flexible metal strip bent back upon itself to form jaws adapted to be drawn together or to be sprung apart, said jaws adjacent their free ends being formed with recessed portions between which a brake rod may be clamped and with a part extending beyond the recessed portions to which a pull cable is adapted to be attached, the major portion of said jaws between the bend and the brake rod receiving portions thereof and forming a loop of sufficient length to encircle the arm of a brake pedal, and means engaging the jaws adjacent the inner edges of the brake rod receiving recesses by means of which said jaws may be drawn together to secure the clip in place either upon a brake rod or upon a brake pedal.

2. A pull cable clip comprising a flexible metal strip bent back upon itself to form jaws adapted to be drawn together or to be sprung apart, said jaws adjacent their free ends having outwardly bowed portions within which a brake rod may be clamped, one of said jaws having an extension at its free end to which a pull cable is adapted to be attached, the major portion of said jaws being between the bend and the brake rod receiving portions thereof and forming a loop of sufficient length to encircle the arm of a brake pedal, and a bolt passing through the jaws adjacent the inner edges of the outwardly bowed portions by means of which said jaws may be drawn together to secure the clip in place upon a brake rod or upon a brake pedal.

In testimony whereof, I hereunto affix my signature.

OSCAR KROEHLE.

Certificate of Correction.

It is hereby certified that in Letters Patent No. 1,448,545, granted March 13. 1923, upon the application of Oscar Kroehle, of Lakewood, Ohio, for an improvement in "Pull-Cable Clips," an error appears in the printed specification requiring correction as follows: Page 1, line 83, claim 1. after the word "jaws" insert the word *being;* and that the said Letters Patent should be read with this correction therein that the same may conform to the record of the case in the Patent Office.

Signed and sealed this 1st day of May, A. D.. 1923.

[SEAL.]
KARL FENNING,
*Acting Commissioner of Patents.*